United States Patent
Yu

(10) Patent No.: US 10,677,949 B2
(45) Date of Patent: Jun. 9, 2020

(54) ANISOTROPY MATCHING FILTERING FOR ATTENUATION OF SEISMIC MIGRATION ARTIFACTS

(71) Applicants: China Petroleum & Chemical Corporation, Beijing (CN); Sinopec Tech Houston, LLC., Houston, TX (US)

(72) Inventor: Jianhua Yu, Houston, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 195 days.

(21) Appl. No.: 15/863,309

(22) Filed: Jan. 5, 2018

(65) Prior Publication Data

US 2018/0188399 A1   Jul. 5, 2018

Related U.S. Application Data

(60) Provisional application No. 62/442,688, filed on Jan. 5, 2017.

(51) Int. Cl.
*G01V 1/36* (2006.01)

(52) U.S. Cl.
CPC ........ *G01V 1/364* (2013.01); *G01V 2210/324* (2013.01); *G01V 2210/51* (2013.01)

(58) Field of Classification Search
CPC ............. G01V 1/364; G01V 2210/324; G01V 2210/51
See application file for complete search history.

(56) References Cited

U.S. PATENT DOCUMENTS

| | | | |
|---|---|---|---|
| 8,218,889 B2* | 7/2012 | Zeng | G06T 5/003 382/255 |
| 9,625,593 B2* | 4/2017 | Neelamani | G01V 1/28 |
| 10,324,207 B2* | 6/2019 | Khalil | G01V 1/325 |

\* cited by examiner

*Primary Examiner* — Mohamed Charioui
(74) *Attorney, Agent, or Firm* — Novick, Kim & Lee, PLLC; Allen Xue

(57) ABSTRACT

An anisotropic filtering method for deblurring complex seismic images from seismic data acquired from anisotropic earth formation. The algorithm is tested using synthetic data. Results demonstrate its effectiveness.

3 Claims, 2 Drawing Sheets

ANISOTROPY MATCHING FILTERING FOR ATTENUATION OF SEISMIC MIGRATION ARTIFACTS

CROSS-REFERENCE TO RELATED APPLICATION

This application claims priority to U.S. Provisional Patent Application having Ser. No. 62/442,688, filed Jan. 5, 2017, and is incorporated herein by reference in its entirety.

FIELD OF TECHNOLOGY

The present disclosure relates generally to an improved method for seismic migration artifacts attenuation and illumination enhancement. More specifically, the present disclosure relates to using anisotropy matching filters for attenuation of seismic migration artifacts.

BACKGROUND

In exploration geophysics, different seismic migration imaging methods, such as reverse time migration (RTM), one-way wave-equation migration, and ray-based migration, are used to map observed seismic data to subsurface true reflectivity positions using the given velocity model in order to obtain the reliable subsurface images for interpretation. Such a process of mapping seismic data to subsurface earth model is called seismic migration.

Seismic migration can be considered as adjoint of seismic forward modeling. Seismic modeling under the Born approximation is approximated as a weighted summation of the Green's function. In matrix form, it can be expressed as d=Gm, in which d is acquired seismic data, m is subsurface earth model, G is modeling operator related to acquisition geometry and earth physical property. The migration image m' is computed by applying the adjoint G' of the forward modeling operator G to the acquired seismic data, m'=G'd=G'Gm. If G'G is not an identity matrix, m' is not the same as m, which means that migrated image m' is a blurred version of true earth model representation. G'G is the blurred matrix related to the limitations in seismic data acquisition aperture, limited seismic imaging aperture, coarse acquisition geometry, etc. The migrated image often contains numerical artifacts or noises. These migration artifacts pollute and degrade seismic image quality, leading to low image resolution and poor image illumination in complex structure area.

Numerous methods have been proposed to address these issues. Two of the commonly used methods are iterative least squares migration and deblur or point spread function (PSF) deconvolution. PSF is also called a blurring kernel. Both these technologies are capable of improving the resolution and suppress acquisition footprints in migrated images or migration artifacts efficiently. Instead of solving for the exact inverse of G'G. PSF deconvolution computes a relatively inexpensive approximation to the inverse of G'G. The drawback of the least squares migration is its high computational cost due to its implementation in an iterative manner. The PSF deconvolution is non-iterative method that is able to reduce migration artifacts efficiently. However, it suffers from instability because of ill-condition in constructing filtering operator.

In reality, the subsurface medium is usually anisotropy. The current isotropic migration deconvolution is not appropriate to handle complex media where there is anisotropy. The current disclosure proposes a new method to build matching filtering operator based on anisotropy modeling and migration engine. The proposed method employs the step of matching filtering. Because the anisotropy propagation engine is used for constructing matching filtering matrix, the new method is an anisotropy matching filtering algorithm for seismic migration artifact attenuation. Synthetic data test results demonstrate its capability of improving the energy focusing and illumination.

SUMMARY

The proposed method is implemented as matching filtering procedure. Because we use anisotropy propagation engine for constructing matching filtering matrix, the new method is called anisotropy matching filtering algorithm for seismic migration artifact attenuation. Synthetic data test results demonstrate its capability of improving the energy focusing and illumination.

In one embodiment, an anisotropic wave-equation propagation engine and/or ray tracing propagation engine are used in constructing match filter operator G'G. Here G' represents migration operator or adjoint of the forward modeling operator G.

DETAILED DESCRIPTION

Figure 1:
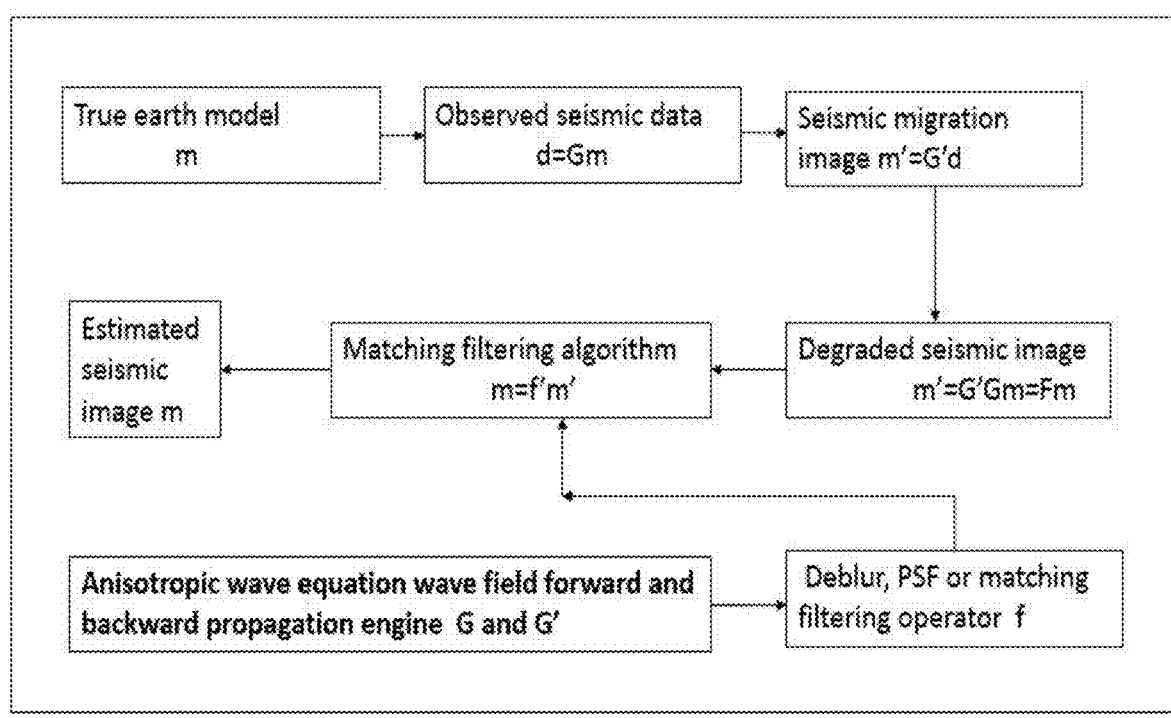
FIG. 1 illustrates a general workflow for seismic imaging degradation and deblurring.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple computer processors, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the scope of the present disclosure.

The Figures (FIG.) and the following description relate to the embodiments of the present disclosure by way of illustration only. It should be noted that from the following discussion, alternative embodiments of the structures and methods disclosed herein will be readily recognized as viable alternatives that may be employed without departing from the principles of the claimed inventions.

Referring to the drawings, embodiments of the present disclosure will be described. Various embodiments can be implemented in numerous ways, including for example as a system (including a computer processing system), a method (including a computer implemented method), an apparatus, a non-transitory computer readable medium, a computer program product, a graphical user interface, a web portal, or a data structure tangibly fixed in a non-transitory computer readable memory. Several embodiments of the present invention are discussed below. The appended drawings illustrate only typical embodiments of the present disclosure and therefore are not to be considered limiting of its scope and breadth.

Reference will now be made in detail to several embodiments of the present disclosure(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

FIG. 1 illustrates main steps in the process of deblurring and denoising a degraded seismic image. First, a degraded seismic images (m') is obtained from observed seismic data collected from seismic survey. A matching filtering algorithm is applied to the degraded image (m') to obtain the estimated seismic image (m), which is the true earth model (i.e., true image) or a better approximation thereof.

One important step in this process is to find the blurring kernel or point spread function (PSF). In a 3D model, the degraded image can be expressed as $$m'(x,y,z)=f(x,y,z)*m(x,y,z) \tag{1}$$

or m'=f m
where m' is degraded image, m is true image, and f is the blurring kernel. The symbol * denotes the 2D or 3D convolution operator. Match filtering is performed for image restoration by applying inversion of the blurring kernel to the degraded image m'. It can be written in the frequency-wavenumber domain as $$m(k)=f^{-1}m'(k) \tag{2}$$

The benefits of using above matching filtering approach for attenuating migration noises include the potential to correct seismic data amplitude distortion, to enhance image illumination, to attenuate migration noise, and to reconstruct more accurate reflectivity distributions of buried seismic image. With appropriate matching filter design, the migration artifacts arising from incomplete data can be suppressed and the illumination of migration images can be enhanced.

Constructing PSF or blurring kernel f requires the modeling engine G and the migration propagation engine G'. Here the acquired seismic data is $$d=Gm \tag{3}$$

where G is the modeling engine, m is true image or true earth reflectivity, and d is observed or acquired data.

Seismic migration can be expressed as $$m'=G'd \tag{4}$$

where m' is migration image; G' is migration propagation engine that is approximated as an inverse operator of G.

After mathematical manipulations, the migration image can be expressed as equation (5)

$$m'=f\,m \tag{5}$$

Here the migration image m' is a blurred vision of the true image m, where f=(G'G), which is a blurring or PSF kernel. Conventional least squares migration attempts to find the solution by minimizing $$G'Gm=G'd \tag{6}$$

The solution to above equation can be obtained by two methods. One method is an iterative process that finds m by implicitly calculate (G'G) using modeling and migration propagation process, i.e., m=arg min‖d−Gm‖$_2$. Another method is a direct inversion approach by compute the inverse of filter f=(G'G). In 3D cases, the drawback is that matrix (G'G) is huge and difficult to calculate in practice.

Conventional matching filtering methods (e.g., migration deconvolution) for seismic imaging that assume an isotropic blurring kernel are not suitable for many real data processing situations. Anisotropy practice in migration is more common in reality. Therefore, using an anisotropy matching filtering in seismic migration artifact attenuation is a more practical imaging application.

A method of this disclosure includes a step of estimating a deblur operator by calculating anisotropy seismic migration Green's function associated with acquisition geometry and velocity model. In one embodiment, constructing anisotropy deblur operator is accomplished by using anisotropy ray tracer as the forward modeling and backward migration propagation engines. An example of such an implement is described in Yu et al. (Yu et al., 2006).

After obtaining the blurring or PSF kernel f, its inverse f' is applied to the blurred version migration image m' to get the more reliable reflectivity m with attenuation of migration distortion m=f'm'.

Figure 2:
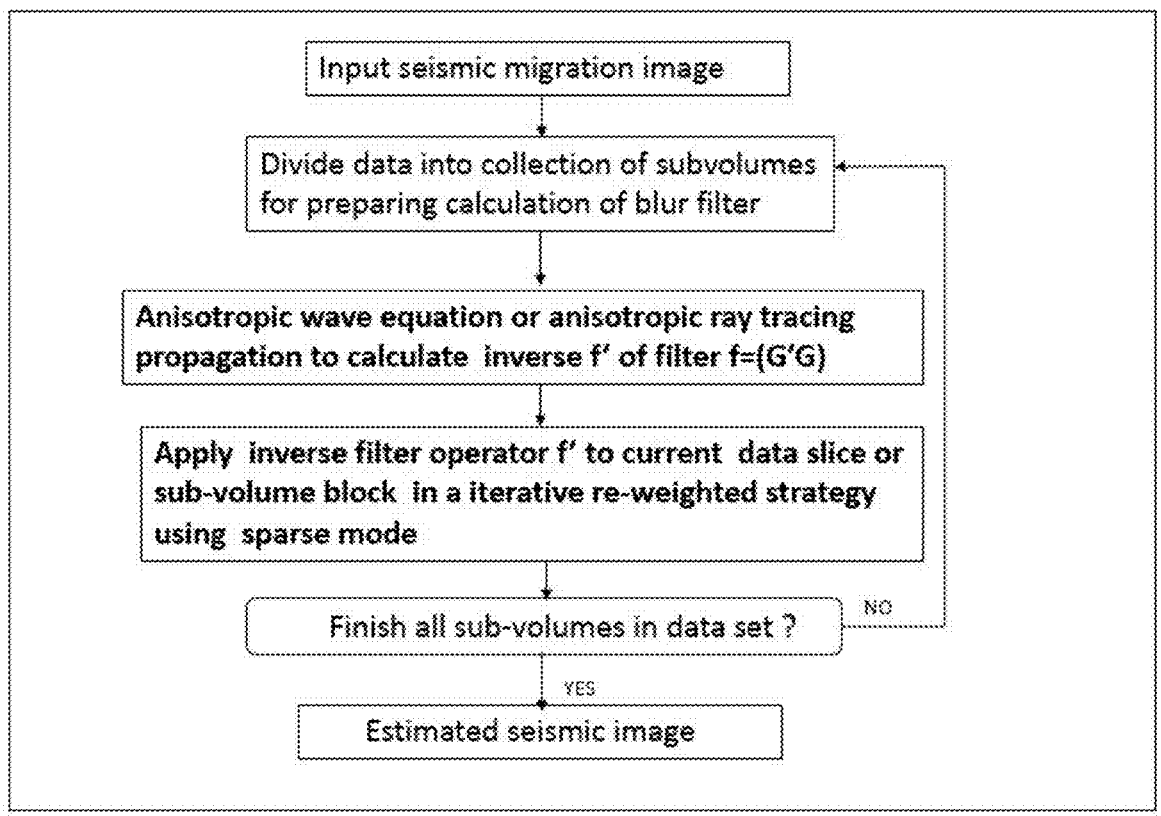
FIG. 2 illustrates a workflow of an anisotropic matching filtering process of the present disclosure.

FIG. 2 illustrates in more detail the inventive method of this disclosure. After obtaining the migration image of an earth formation, the data volume is divided into a collection of sub-volumes. (Note that the data volume corresponds to the physical volume of the earth formation.) The sub-volumes can either be 2D (e.g., slices) or 3D (cubes). The purpose is to prepare a blurring filter in lateral space and vertical depth or time for each of sub-volumes. The blurring kernel f is calculated using anisotropic wave equation or anisotropic ray tracing propagation for each sub-volume. The blurring kernel f is then applied to each of the sub-volume of dataset iteratively until all of sub-volume data are completed. The final estimated seismic image is reconstructed using all sub-volume data after deblurring. By implementation one sub-volume a time, this method dramatically reduces the computational cost and improves stability comparing to traditional methods.

Figure 3:
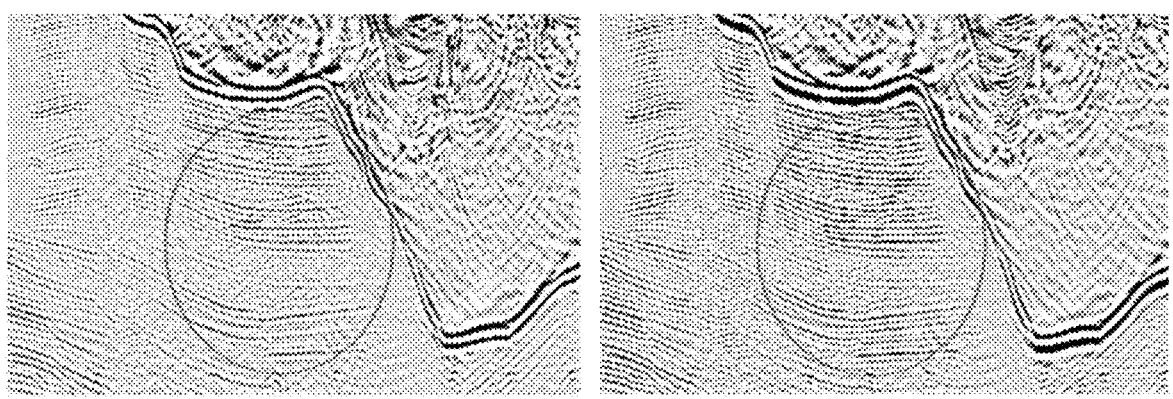
FIG. 3 shows an anisotropy migration image (left panel) and a migration denoised using anisotropic matching filter (right panel).

FIG. 3 demonstrates the results of the inventive method. The left panel in FIG. 3 is standard migration using standard wave-equation migration. Poor illumination is observed under salt body, e.g., in the area inside the circle. After applying anisotropic matching filtering illustrated in this disclosure, amplitude is recovered and the image is improved with better reflectivity in the bottom part as seen in the area inside the circle.

The proposed anisotropic filtering method is an improvement over the conventional PSF or deblurring deconvolution method for the purpose to deal with more complex seismic imaging situations where anisotropic issues occur in the acquired data. The algorithm is tested on synthetic data. Results demonstrate its effectiveness.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

REFERENCES

Yu, J., Hu, J., Schuster, G., and Estill, R., 2006, Prestack migration deconvolution, GEOPHYSICS, 71(2), S53-S62.

What is claimed is:

1. A method for attenuation of seismic migration artifacts, comprising:

obtaining a volume of seismic data of an earth formation;

dividing the data volume into a plurality of sub-volumes of data to obtain a degraded seismic image m';

calculating a blurring kernel f for each of the plurality of sub-volumes of data, wherein the blurring kernel f is obtained by calculating anisotropy seismic wavefield Green's function G;

performing matching filter for each of the plurality of sub-volumes of data by applying inversion of the blur kernel f' to the degraded seismic image m' to obtain a reconstructed seismic image m;

and reconstructing an estimated seismic image of the earth formation using the reconstructed seismic image m from each of the plurality of sub-volumes.

2. The method of claim 1, wherein each of the sub-volumes of data is a slice of data volume or a cube of data volume.

3. The method of claim 1, wherein the blurring kernel f=(G'G), in which G is used a forward modeling engine and G' is a migration propagation engine that is approximated as an inversion of G.

* * * * *